(12) United States Patent  
Hughes et al.

(10) Patent No.: US 6,950,571 B1
(45) Date of Patent: Sep. 27, 2005

(54) OPTICAL SWITCHABLE COMPONENT

(75) Inventors: Tudur A Hughes, Walthamstow (GB); Andrew L Reynolds, Epping (GB); Gordon D Henshall, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 384 days.

(21) Appl. No.: 10/176,140

(22) Filed: Jun. 20, 2002

(51) Int. Cl.[7] .............................. G02B 6/28; G02B 6/42
(52) U.S. Cl. ........................................ 385/24; 385/14
(58) Field of Search .............................. 385/14, 34, 18, 385/96, 87, 131, 132, 16, 24, 27

(56) References Cited

U.S. PATENT DOCUMENTS

| | | | | |
|---|---|---|---|---|
| 5,861,967 A | * | 1/1999 | Mizuochi et al. ............. | 398/87 |
| 6,160,834 A | * | 12/2000 | Scott ........................... | 372/96 |
| 6,504,968 B1 | * | 1/2003 | Zhu et al. ..................... | 385/18 |
| 6,542,665 B2 | * | 4/2003 | Reed et al. ................... | 385/34 |
| 6,640,021 B2 | * | 10/2003 | Pogge et al. .................. | 385/14 |

* cited by examiner

*Primary Examiner*—Thien M. Le
(74) *Attorney, Agent, or Firm*—Barnes & Thornburg

(57) ABSTRACT

An optical add drop component uses wavelength-selective reflectors which are switchable between first and second positions. This enables an add or drop function to be selectively applied. When the add or drop function is not required, there is no signal attenuation or degradation of an input signal. When an add or drop function is required, selected frequencies are added or dropped and other signal frequencies can pass through the wavelength-selective reflector. No demultiplexing operation is required.

17 Claims, 3 Drawing Sheets

OPTICAL SWITCHABLE COMPONENT

FIELD OF THE INVENTION

This invention relates generally to optical switchable components, and more specifically to micro electro mechanical (MEM) switching devices.

BACKGROUND OF THE INVENTION

Optical communication systems require high speed data, implemented as optical signals, to be switched between ports of a switching device to allow a signal routing function. Typically, the optical signals are carried by optical fibers, which connect to the optical switching device. There are currently a number of methods for achieving the required switching operation.

One solution comprises an electromechanical arrangement, where a signal in an optical fiber A is routed to fiber B by mechanically aligning fiber A with fiber B. This arrangement is bulky and mostly suited only to 1×N switch configurations.

An alternative solution is to use a hybrid optical switch in which the optical signals are first converted to electrical signals which are switched in a conventional manner. The resulting outputs of the switch are then converted back to optical signals. This adds complexity and expense to the switching operation.

Optical switches are also known in which a control signal is used to vary the path of an optical signal. For example, waveguide-based switches rely on the change of refractive indices in the waveguides under the influence of an external electric field, current or other signal.

Optical switches using an array of mirrors which can be mechanically tilted are also known. Small micromirrors (for example less than 1 mm) are arranged in a line or array, and the incident light signal is deflected by controlling the tilt angle of each micromirror. Mirror type optical switches include digital micromirror devices which tilt each micromirror by electrostatic force, piezoelectric drive micromirror devices which tilt each micromirror by a fine piezoelectric element and electromagnetic devices which rely upon electromagnetic and electrostatic forces.

In a typical micromirror device, a plurality of micromirrors are arranged in an array of N×M mirrors. Each micromirror can be controlled and is capable of switching between a first reflection state and a second non-reflection state. The optical signal is routed between an input and a selected output by controlling the reflection state of each mirror.

Conventional micromirror arrays use highly reflective coatings, such as gold, to provide reflection for all wavelengths of the optical signals.

WDM (wavelength division multiplex) optical communications systems combine signals by providing different channels on different carrier frequencies. These channels are combined into a WDM signal, which is carried on fiber spans across a network. The combining (multiplexing) of channels into a single WDM signal, or the separation (demultiplexing) of channels from the WDM signal, requires optical components capable of separating or combining channels based on the channel frequencies.

In addition to multiplexing and demultiplexing operations, it is often desirable to tap or add one or more individual selected channels from/to a WDM signal, rather than performing a full demultiplex/multiplex operation, for example to perform add/drop operations or for channel monitoring or processing.

The optical add/drop multiplexer, OADM, is a key component in an all optical network (AON). OADM's are designed to allow selection of either a single channel or band of channels from an optical signal to allow routing at a network node. This selection and removal of channels is known as the drop function. Thereafter, the OADM will provide the functionality to allow different data to be reinserted on the wavelengths of the channel(s) that have been dropped, providing the add function. With the functionality of being able, dynamically, to add and drop channels optically, the network becomes optically agile allowing wavelength reuse and rerouting to reflect altering demands on a very short timescale.

Generically, OADM functionality can be achieved optically by demultiplexing the optical signal into several paths, each either carrying a single or a few channels. The switching function therefore need not be channel selective as the channel separation has already occurred.

It has been recognised that it would be preferable to perform the add/drop function without requiring this full demultiplex operation. For example, microring resonators have been proposed as a compact, scalable and integrable way of providing photonic switching functions due to their wavelength selectivity. As Microring resonators (MRR's) are wavelength selective, no demultiplexing is required for their application. They do however introduce some loss and are not switchable devices.

SUMMARY OF THE INVENTION

According to a first aspect of the invention, there is provided an optical component comprising a wavelength-selective reflector which is switchable between first and second positions, a first position in which the reflector is not in the path of an optical input signal, so that an input signal can pass to a first output, and a second position in which the reflector is in the path of an optical input signal, so that signals of a first wavelength or band of wavelengths can be dropped from or added to the input signal.

This arrangement enables an add or drop function to be selectively applied. When the reflector is in the first position, and the add or drop function is not required, there is no signal attenuation or degradation of an input signal. When an add or drop function is required, the reflector is placed in the path of the signal. Signal frequencies which are not to be added or dropped can pass through the wavelength-selective reflector, and no demultiplexing operation is therefore required.

Preferably, the component has at least two wavelength-selective reflectors, one for dropping a selected wavelength or wavelength band from a multi-channel optical input, and one for adding the selected wavelength or wavelength band to the multi-channel optical input. Any dispersion introduced by one of the reflectors, for signals passing through, is cancelled by the other reflector of the pair, as they are arranged symmetrically to perform the add and drop functions. The two similar filters also give improved isolation of the add/drop frequencies from the WDM signal.

Preferably, there are a plurality of pairs of wavelength-selective reflectors, each pair being tuned to a different wavelength or band of wavelengths. This enables a single component to provide add/drop capability for a number of channels or groups of channels. All of the wavelength-selective reflectors are then arranged in a line, with an input at one end of the line and an output at the other end of the line, and an add or drop port associated with each reflector.

Each pair of wavelength selective-reflectors may be for adding or dropping a band of channels. This simplifies network management. The component may then further comprises periodic filters for separating individual channels from the bands of channels and for combining individual channels into the bands of channels.

The or each wavelength-selective reflector can comprise a transparent substrate over which is provided a thin film filter layer.

According to a second aspect of the invention, there is provided a method of manufacturing an optical component, comprising:

forming a plurality of mircomirror elements over a substrate, each micromirror element comprising a substantially transparent support and being switchable between first and second positions;

depositing thin film filter layers over the transparent support to define wavelength selective reflector surfaces.

A plurality of different thin film filter layers can be provided for different micromirror elements, and the step of depositing thin film filter layers comprises using a mask to select desired micromirror elements.

According to a third aspect of the invention, there is provided a method of dropping channels or groups of channels from a WDM optical signal, the method comprising:

switching a wavelength-selective reflector into the path of the WDM optical signal, the reflector having a reflection response which results in reflection of the a selected channel or group of channels to a drop port, and allows transmission of other channels to a through port.

According to a fourth aspect of the invention, there is provided a method of adding channels or groups of channels to a WDM optical signal, the method comprising:

switching a wavelength-selective reflector into the path of the WDM optical signal, the reflector having a reflection response which results in reflection of a selected channel or group of channels from an add port into the path of the WDM optical signal.

The invention also provides a wafer comprising a substrate and a plurality of optical components of the invention formed over the substrate. The invention also provides an optical add drop multiplexer having an input and an output, and further comprising one or more optical components of the invention arranged between the input and the output.

Other aspects of the invention include software for implementing the manufacturing method or for carrying out the control of the add/drop multiplexer. This acknowledges that such software can be a valuable, separately tradable commodity. It is also intended to encompass software which "describes" or defines the configuration of hardware, such as HDL (hardware description language) software, as is used for designing silicon chips, or for configuring universal programmable chips, to carry out desired functions.

BRIEF DESCRIPTION OF THE DRAWINGS

Examples of the invention will now be described in detail with reference to the accompanying drawings, in which.

DETAILED DESCRIPTION

Figure 1:
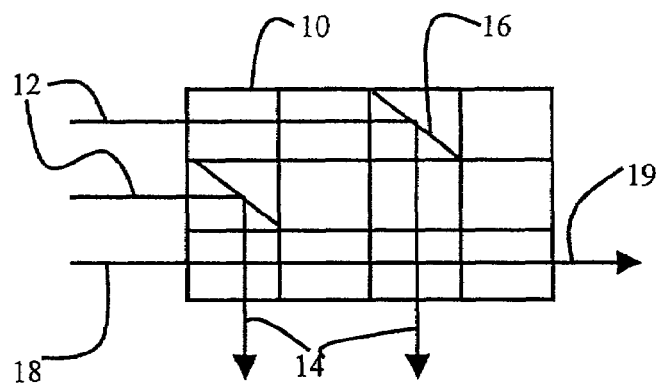
FIG. 1 shows a MEMS micromirror switching array and is used to explain the known operation of the array.

FIG. 1 is used to explain the known operation of a MEMS micromirror switching array 10 which comprises an array of small (typically less than 1 mm) mirrors arranged in orthogonal rows and columns. The inputs 12, 18 to the switching array are provided at one edge of the array, and the reflected signal outputs 14 from the array are collected from an orthogonal edge. Of course, the signals do not necessarily need to be reflected by 90 degrees, and mirror arrangements may provide different angles between the input and output optical paths. Each mirror is moveable between first and second positions. In one of the positions, the mirror lies outside the path of an incident optical signal so that the signal can pass through as shown for signal 18 which passes through to output 19, whereas in the other of the positions, an incident optical signal is reflected by the mirror to an associated output. The micromirror switching array 10 is fabricated using standard lithographical and semiconductor processing techniques which will be known to those skilled in the art.

Conventional micromirror arrays use highly reflective mirror surfaces, which in particular reflect all optical signal wavelengths.

In accordance with the invention, micromirrors are used to provide rerouting of an optical signal, but wavelength-selective routing is carried out by providing wavelength-selective mirrors.

Figure 2:
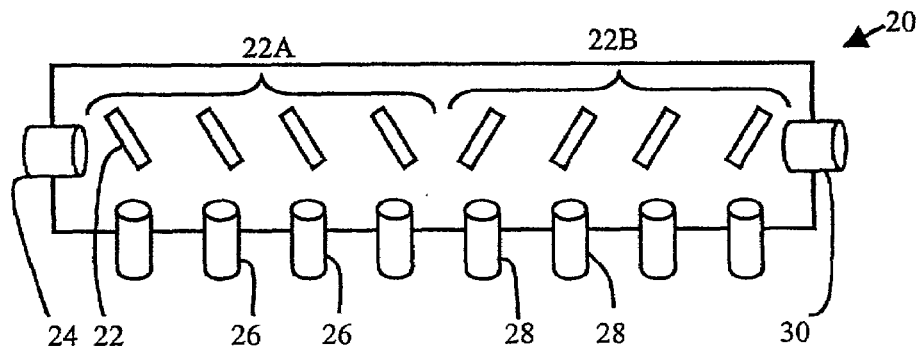
FIG. 2 shows a first example of component in accordance with the invention.

FIG. 2 shows an application of the invention, to provide an optical add/drop multiplexer.

The component 20 comprises a linear array of micromirrors 22 arranged in two groups 22A and 22B. Each micromirror 22 is a wavelength-selective reflector which is switchable into and out of the path of an input signal received from an input optical fiber 24.

The mirrors of the first group 22A selectively provide a reflection path to drop ports 26, also arranged as optical fiber connections. The mirrors of the second group 22B are arranged to selectively reflect signals received from add ports 28 into the path of the signal from the input fiber 24. The component 20 has an output associated with an output optical fiber 30. The fibers are typically located by V-grooves in the substrate of the component 20.

Each mirror is designed to reflect a selected range of frequencies and to transmit all other frequencies. In other words, the reflection response of each mirror has a band pass filter characteristic.

Thin film filter layers are well known for providing this wavelength-selective reflection response. These filter layers can be deposited using conventional deposition techniques. To provide wavelength-selective reflection and transmission of other frequencies, the mirrors 22 in the component of the invention are formed as a transparent substrate coated with the dielectric thin film filter layers.

Each mirror enables a single wavelength or a group of wavelengths to be diverted from the others. By selectively switching the mirrors into or out of the path of the input signal, through traffic can pass through unaffected. If only one channel or band of channels is to be added or dropped, a single pair of filters can be switched into the path of the input signal. The component is therefore configurable according to the add and drop requirements so that the minimum number of filters are in the path of the optical signal.

The invention enables an optical add drop multiplexer to be fabricated with a small number of parts and with low volume. In particular, the need for full demultiplexing is avoided.

When each mirror 22 is for reflecting a selected band of wavelengths, a colourless device (namely one which is not tailored to a particular wavelength but which has an appropriate response across the full band of wavelengths) with an appropriate free spectral range can be used to select the appropriate channel of the band. In particular, an identical colourless device can be used for each band.

Figure 3:
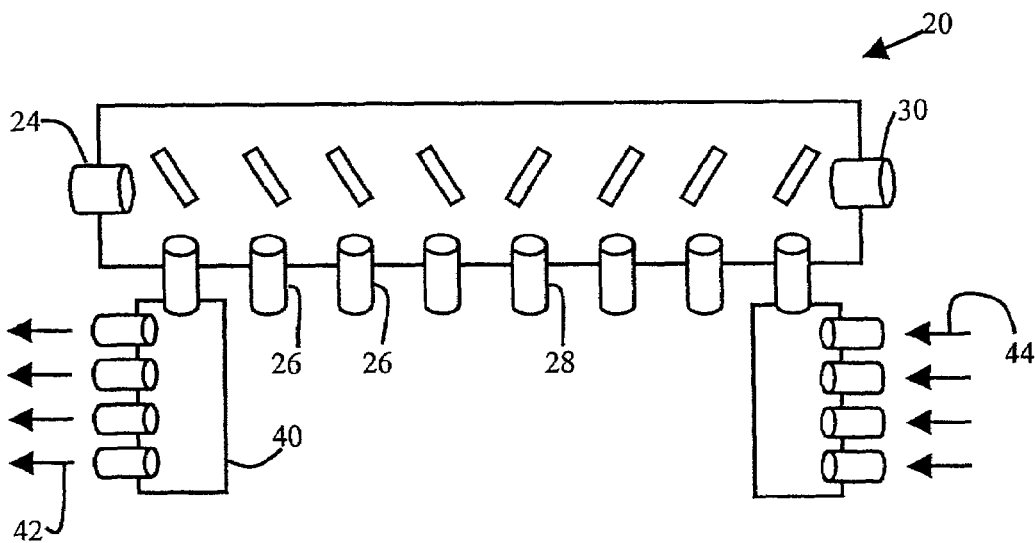
FIG. 3 shows a second example of component in accordance with the invention.

FIG. 3 shows how a periodic filter 40 can be provided at the output of a drop port 26 and at the input of an add port 28 for separating a band of channels into individual channels 42 or for combining individual input channels 44 into a band to be supplied at the add port 28.

This periodic filter device may be constructed using micro-ring resonators, which have a periodic filter response which can be shifted in frequency to enable individual channels to be selected.

In the example shown in FIGS. 2 and 3, there are four pairs of mirrors 22, each of the pairs of mirrors being tuned to a different channel or band of channels. In practice, different numbers of mirrors may be used, for example 16 mirrors may be used for adding and dropping signals within eight bands of channels, with each band containing four channels.

When one filter is inserted into the path of the WDM optical input signal, different channels (having different wavelengths) will be dispersed and hence shifted laterally. The symmetric arrangement shown in FIGS. 2 and 3 enables this lateral shift to be compensated between each pair of filters, as a result of the symmetry between the add filter and the drop filter. This applies regardless of the number of pairs of filters switched into the optical path. There is also an improvement in isolation by the series arrangement of two similar filters.

Each pair of filters is provided with a thin film filter selected for the specific wavelength or band of wavelengths. Clearly, this requires different mirrors to have different coatings.

Figure 4:
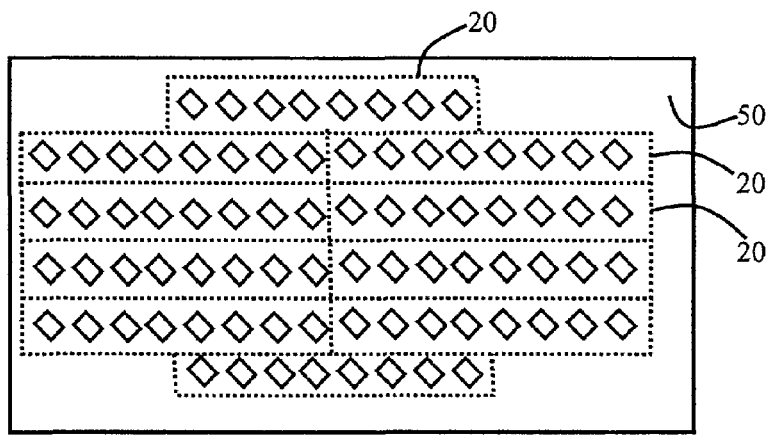
FIG. 4 shows how many components can be fabricated on a single substrate.

As shown in FIG. 4, a number of devices 20 may be fabricated over a common substrate 50. FIG. 4 shows the arrangement of mirrors 22 over a common substrate 50 to enable ten of the devices shown in FIGS. 2 and 3 to be fabricated using common processing steps.

Figure 5:
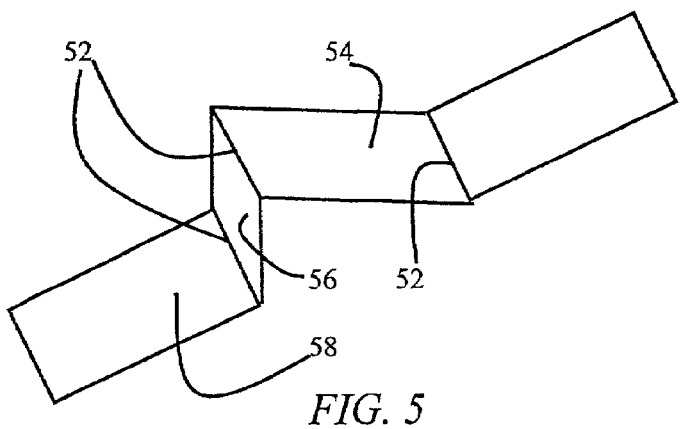
FIG. 5 shows one possible mirror configuration.

There are a number of different MEM device topologies which will be known to those skilled in the art. By way of example, FIG. 5 shows one possible moveable micromirror arrangement comprising polysilicon plates interconnected by hinges 52. These plates define a support 54, a mirror surface 56 and a slider 58. The fabrication process for this type of device uses sacrificial films which are eventually removed to enable the components of the mirror to be released for movement. During the fabrication process, the mirror surfaces are parallel with the substrate 50, and this enables additional films such as the thin film filter layers to be deposited easily over the substrate of the mirror 56.

Figure 6:
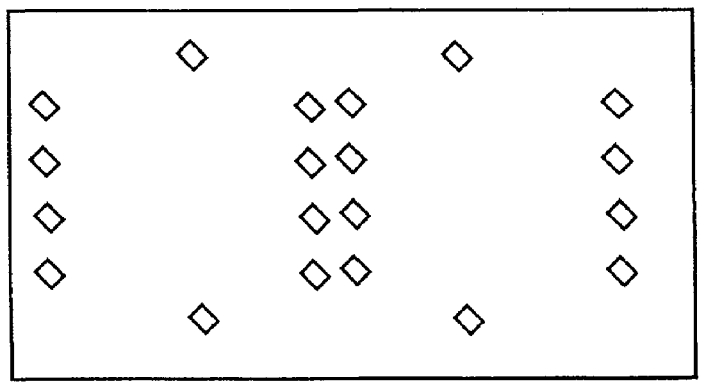
FIG. 6 shows one mask used within the fabrication process.

To deposit different film layers over different mirrors 22, masks are used as shown in FIG. 6. The mask of FIG. 6 enables suitable coatings to be applied to the mirrors at each end of each component, and the mirrors at each end then define a pair for adding and dropping the selected channel or band of channels.

It is desirable for the through traffic between the input and output fibers 24, 30 of the component 20 to be undisturbed as the selected add and drop mirrors are moved into the path of the signal. For this purpose, lateral movement mirrors may be employed, where the angle of the surface remains constant as the mirror enters the signal path.

The switchable nature of the component of the invention also enables reconfiguration of a network to be carried out without disruption, and enables automated reconfiguration. In particular, manual reconfiguration of components is not required when changing the add and drop requirements at a node. For example, if wavelengths are no longer in use at a particular node (if the client contract for the allocation of those wavelengths is terminated), these wavelengths can be reallocated to a different node, an operation known as a "churn". There is no need to remove the add drop filters when reconfiguring, as the mirrors can simply be switched out of the path of the signals through the node.

By inserting a polarization splitter and a half wave plate at the input and exit fibers 24, 30, a polarization diverse solution can be obtained. This arrangement ensures that any signal to pass through the device is split into two components which are manipulated to have the same polarization (regardless of the input polarization). The components then pass through the device. In this way, any polarization dependent loss is cancelled. The components are re-manipulated and recombined at the output. This is a well known technique for providing polarization diversity.

Figure 7:
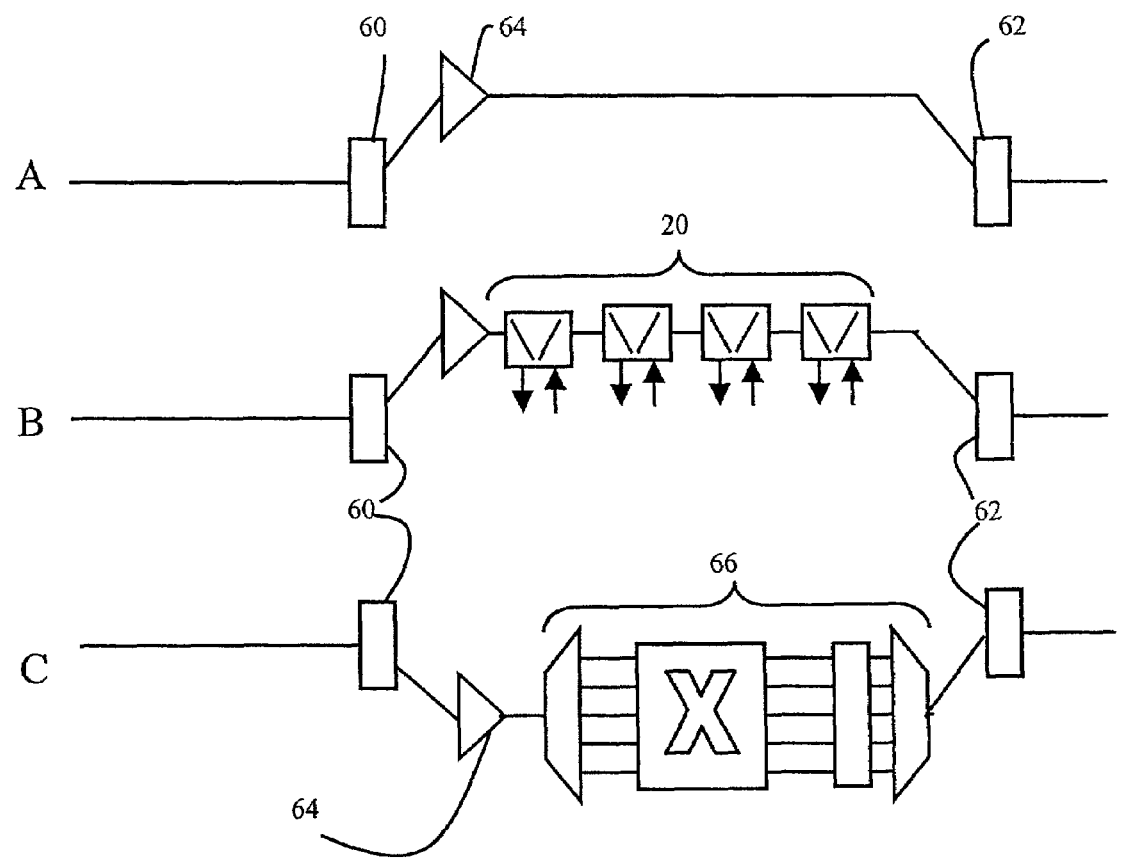
FIG. 7 shows how the component of the invention can be used within an upgrade schedule of an optical communications system node.

The component of the invention can also be used to allow a network to be scaled as more wavelengths are added. FIG. 7A shows an amplification site in which no add/drop capability is initially required. To enable this amplification site to be upgraded it can be provided with a splitter 60 and switch 62, with a booster amplifier 64 between the splitter 60 and switch 62. The splitter 60 and switch 62 are optional, although their benefit later in the upgrade scheme will become apparent. The switch 62 routes the amplified signal from the amplifier 64 towards the output. FIG. 7B assumes that some add/drop capability is now required at the site of the node, for example as a result of a population increase at that location. In order to achieve the adding or dropping of a small number of wavelengths at lowest cost, the component 20 of the invention is provided in the path, again between the splitter 60 and the switch 62. During installation of the component 20 alternative protection paths through the network can be employed to avoid the need to disrupt service.

As the requirement for additional add/drop or signal routing capability increases, additional components can be introduced. Eventually, an upgrade can be carried out in the unused path. As shown in FIG. 7C, an amplifier 64 is provided in a second path together with a full signal routing portion 66 having full demultiplex capability. Traffic can then be switched to the second path, by controlling the switch 62 to route signals from the second path to the output. This then enables the first path to be upgraded.

In this way, the component of the invention can be used in an incremental upgrade operation for a node. For example, the number of switching planes providing add/drop and signal routing capability can be incrementally increased.

We claim:

1. An optical component comprising a wavelength-selective reflector which is switchable between first and second positions, a first position in which the reflector is not in the path of an optical input signal, so that an input signal can pass to a first output, and a second position in which the reflector is in the path of an optical input signal, so that signals of a first wavelength or band of wavelengths can be dropped from or added to the input signal.

2. A component as claimed in claim 1, comprising at least two wavelength-selective reflectors, one for dropping a selected wavelength or wavelength band from a multi-channel optical input, and one for adding the selected wavelength or wavelength band to the multi-channel optical input.

3. A component as claimed in claim 2, comprising a plurality of pairs of wavelength-selective reflectors, each pair being tuned to a different wavelength or band of wavelengths.

4. A component as claimed in claim 3, wherein all wavelength-selective reflectors are arranged in a line, the component having an input at one end of the line and an output at the other end of the line, and an add or drop port associated with each reflector.

5. A component as claimed in claim 4, wherein the input and output and each port are coupled to an optical fiber.

6. A component as claimed in claim 1, comprising a plurality of wavelength-selective reflectors arranged in a line, the component having an input at one end of the line and an output at the other end of the line, and an add or drop port associated with each reflector.

7. A component as claimed in claim 6, wherein the input and output and each port are coupled to an optical fiber.

8. A component as claimed in claim 3, wherein each pair of wavelength selective-reflectors is for adding or dropping a band of channels, and wherein the component further comprises a plurality of periodic filters for separating individual channels from the bands of channels and for combining individual channels into the bands of channels.

9. A component as claimed in claimed in claim 1, wherein the wavelength-selective reflector comprises a transparent substrate over which is provided a thin film filter layer.

10. A method of manufacturing an optical component, comprising:
   forming a plurality of micromirror elements over a substrate, each micromirror element comprising a substantially transparent support and being switchable between first and second positions;
   depositing thin film filter layers over the transparent support to define wavelength selective reflector surfaces.

11. A method as claimed in claim 10, wherein a plurality of different thin film filter layers are provided for different micromirror elements, wherein the step of depositing thin film filter layers comprises using a mask to select desired micromirror elements.

12. A method of dropping channels or groups of channels from a WDM optical signal, the method comprising:
   switching a wavelength-selective reflector into the path of the WDM optical signal, the reflector having a reflection response which results in reflection of a selected channel or group of channels to a drop port, and allows transmission of other channels to a through port.

13. A method of adding channels or groups of channels to a WDM optical signal, the method comprising:
   switching a wavelength-selective reflector into the path of the WDM optical signal, the reflector having a reflection response which results in reflection of a selected channel or group of channels from an add port into the path of the WDM optical signal.

14. A wafer comprising a substrate and a plurality of optical components formed over the substrate, each optical component comprising a wavelength-selective reflector which is switchable between first and second positions, a first position in which the reflector is not in the path of an optical input signal, so that an input signal can pass to a first output, and a second position in which the reflector is in the path of an optical input signal, so that signals of a first wavelength or band of wavelengths can be dropped from or added to the input signal.

15. An optical add drop multiplexer having an input and an output, and further comprising at least one optical component arranged between the input and the output, the optical component comprising a wavelength-selective reflector which is switchable between first and second positions, a first position in which the reflector is not in the path of an optical input signal, so that an input signal can pass to a first output, and a second position in which the reflector is in the path of an optical input signal, so that signals of a first wavelength or band of wavelengths can be dropped from or added to the input signal.

16. An optical communications system comprising at least one an optical add drop multiplexer having an input and an output, and further comprising at least one optical component arranged between the input and the output, the optical component comprising a wavelength-selective reflector which is switchable between first and second positions, a first position in which the reflector is not in the path of an optical input signal, so that an input signal can pass to a first output, and a second position in which the reflector is in the path of an optical input signal, so that signals of a first wavelength or band of wavelengths can be dropped from or added to the input signal.

17. A method of offering a data transmission service over an optical transmission system using an optical add drop multiplexer having an input and an output, and further comprising at least one optical component arranged between the input and the output, the optical component comprising a wavelength-selective reflector which is switchable between first and second positions, a first position in which the reflector is not in the path of an optical input signal, so that an input signal can pass to a first output, and a second position in which the reflector is in the path of an optical input signal, so that signals of a first wavelength or band of wavelengths can be dropped from or added to the input signal.

* * * * *